United States Patent [19]

Seol

[11] Patent Number: 4,630,839

[45] Date of Patent: Dec. 23, 1986

[54] PROPULSION MECHANISM FOR LEVER PROPELLED BICYCLES

[75] Inventor: Marn T. Seol, Rochester, N.Y.

[73] Assignee: Alenax Corp., Rochester, N.Y.

[21] Appl. No.: 759,995

[22] Filed: Jul. 29, 1985

[51] Int. Cl.⁴ .............................................. B62M 1/04
[52] U.S. Cl. .................................... 280/255; 280/236
[58] Field of Search ............... 280/253, 255, 258, 236, 280/238; 74/138

[56] References Cited

U.S. PATENT DOCUMENTS 3,759,534  9/1973  Clark .................................... 280/236
4,421,334 12/1983  Efros .................................... 280/236

Primary Examiner—John J. Love
Assistant Examiner—Donn McGiehan
Attorney, Agent, or Firm—Martin LuKacher

[57] ABSTRACT

A bicycle having pivoted lever pedal system (1, 2, 45) and lever arm length or gear ratio (speed) change devices (3, 4, 5, 6). Propulsion forces from the lever pedals (1) are transferred via the lever arm length change device (3) through a flexible interconnecting cable and pulley system (7, 8, 9, 10, 11, 12, 13) to a rear drive hub assembly 14 having a pair of one-way clutches which allow the transfer of forward driving forces and enable the bicycle to be rolled back.

34 Claims, 9 Drawing Figures

FIG. I

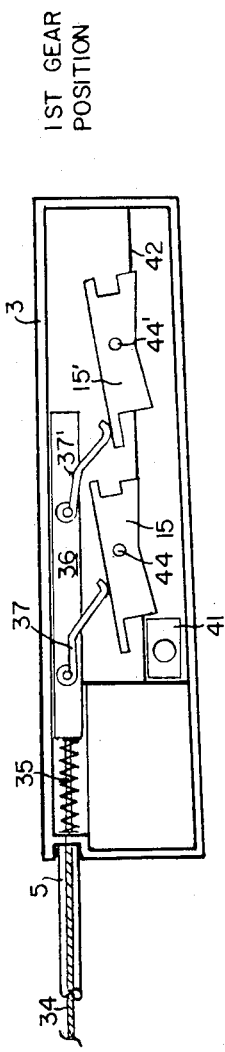
FIG. 6(A) 1ST GEAR POSITION
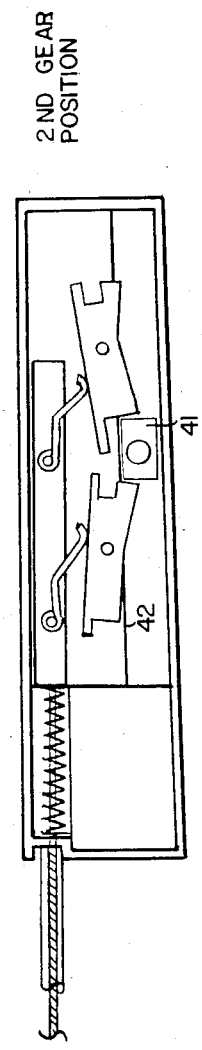
FIG. 6(B) 2ND GEAR POSITION
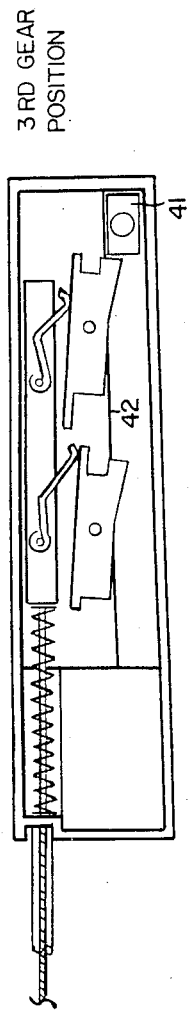
FIG. 6(C) 3RD GEAR POSITION

PROPULSION MECHANISM FOR LEVER PROPELLED BICYCLES

DESCRIPTION

This invention relates to propulsion mechanisms for lever propelled bicycles.

The invention is especially suitable for use in a bicycle which is propelled by transmitting force imparted from the up and downward motion of propulsion levers to the rear wheel through a chain and chain gears (also known as sprockets) in which lever arm or gear ratio change (also known as speed change) is achieved by changing the position of connection of the chain on the levers. It will appreciated that the term, bicycle, comprehends other vehicles which are adapted to be propelled in a similar manner and which have a different number of wheels, such as tricycles.

The present invention is an improvement upon the bicycles described in my European Patent Application which was published under Publication No. 0088448 on Sept. 14, 1983 and its counter part U.S. patent application Ser. No. 463,085 filed Feb. 2, 1983, now U.S. Pat. No. 4,574,679, issued Mar. 11, 1986. The present invention provides improvements in the interconnection of the pedal levers through a flexible closed loop system which reduces shock vibration and backlash. The invention also provides improved one-way clutches which enable the bicycle to be rolled back without dragging or interference and utilizes the combination of two, pawl and ratchet mechanisms in each one-way clutch. A separate clutch is preferably mounted on each side of the rear drive hub. The invention also improves the lever arm length or gear ratio (speed) change method by providing improved speed change devices wherein variable ratios are obtained through changing the lever arm length by connecting the cable at a plurality of locations which are selected by rocking pawls in a housing to different positions in respect to a surface along which the chain connector moves. The speed change device is characterized by a design which can be fabricated at low cost and in a small size so as to enable it to be located on the same side of the main shaft and upon the pedal levers, thereby providing lever bicycles of smaller size, such as may be used by children, such as the so called BMX class of bicycles.

The foregoing and other features, objects, and advantages of the invention will become more apparent from a reading of the following description in connection with the accompanying drawing in which:

FIG. 6 is a schematic view of the speed change device with the side thereof cut away so as to diagrammatically illustrate the operation of the mechanism in first, second, and third gear positions in views (A), (B), and (C), respectively.

Figure 1:
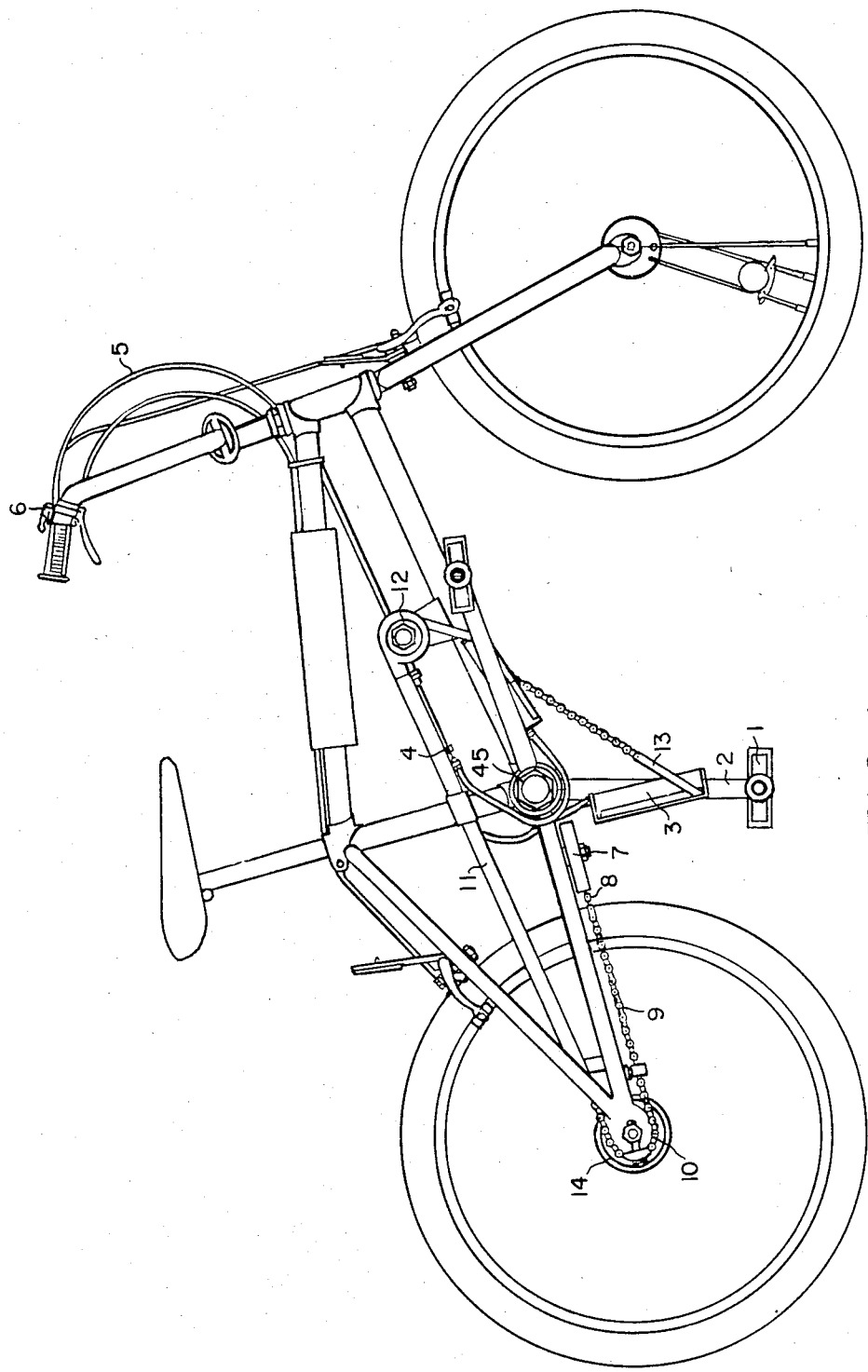
FIG. 1 is a front view illustrating a BMX bicycle equipped with a propulsion mechanism embodying the invention.
Figure 2:
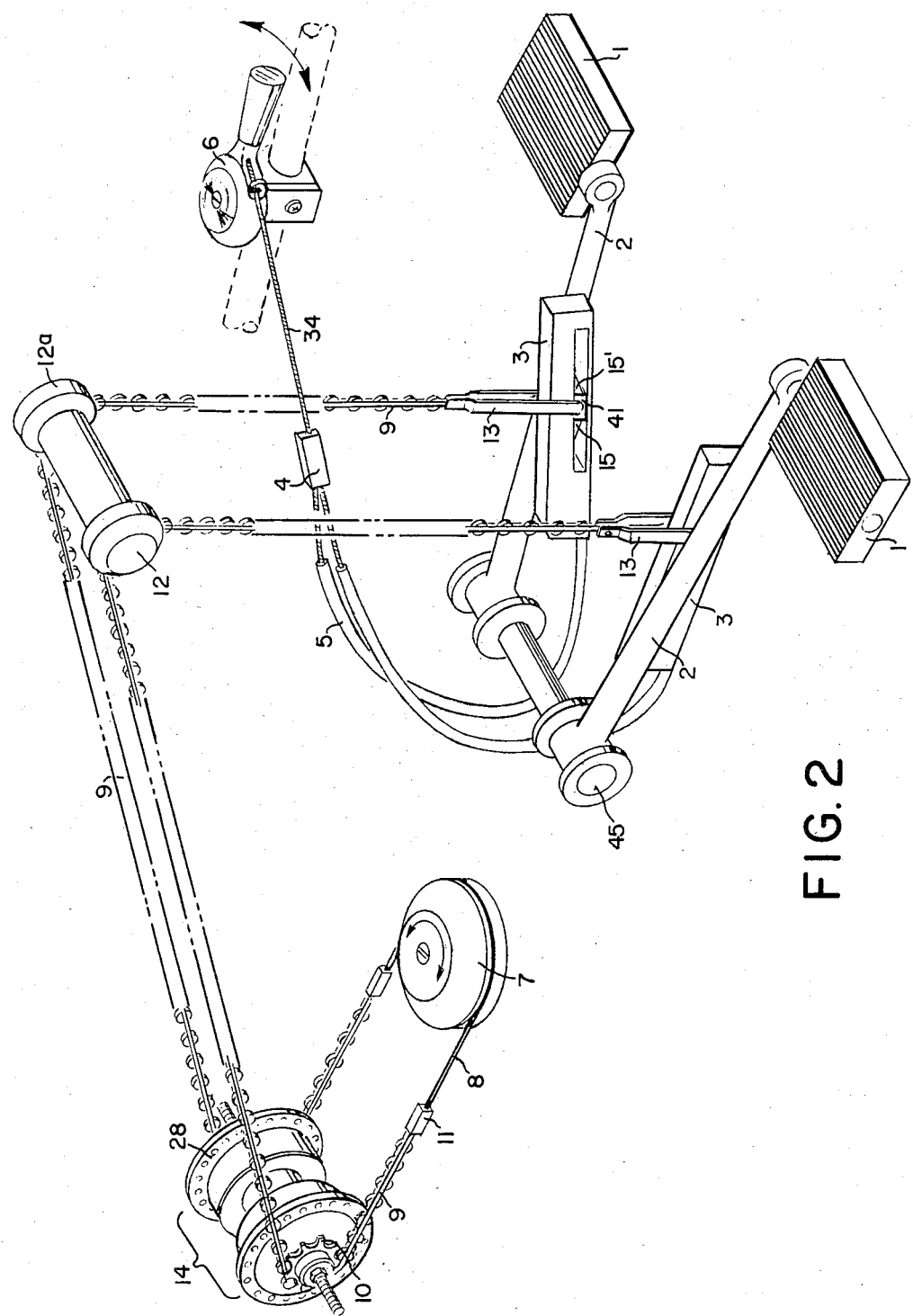
FIG. 2 is a diagrammatic, perspective view illustrating the speed change mechanism used on the bicycle shown in FIG. 1, in greater detail.

Referring to FIGS. 1 and 2, there is shown a bicycle having a frame 11 with a hub having a main shaft 45 and a rear portion for receiving a drive hub assembly 14. The propulsion system utilizes a pivoted lever pedal system having the pedals 1, pedal levers 2 and speed change devices 3, which are pivotally mounted on the main shaft 45 on the same side of the shaft. The speed or gear ratio change devices 3 are mounted on the pedal levers 2, thereby enabling the mechanisms to be configured in a small space suitable for use on a BMX bicycle as shown in FIG. 1. The propulsion, lever mechanisms are one piece integrated propulsion lever and speed change device assemblies. The number of parts in these assemblies is less than in conventional bicycles, and their structure is simple and economical. Another advantage over conventional bicycles is that length of the drive chain 9 is not changed when shifting gears. The speed change device 3 is designed so that the length of the chain 9 remains constant for all gear ratios. No derailleur system is necessary. There are no side thrusts on the chain.

The speed change device 3, which may be also referred to as the lever arm length or gear ratio change device, has a housing in which a link member 41 is longitudinally moveable. The location of the member 41 is varied by means of rocking pawls 15, 15'. (FIG. 6.); the pivotal location of which is determined by camming them with a speed change bar 36 from which spring fingers 37 depend. The bar 36 is biased by a spring 35 towards one end of the housing and is actuated to select the different locations and the different (three different) gear ratios by means of cables 5 interconnected at a block 4 and connected through an extension cable 34 to a speed change control lever 6 (See FIG. 2) mounted on the frame 11.

The rear hub assembly has sprockets 10 on opposite sides thereof and includes a hub 28 to which the rear wheels are attached in the usual way by spokes (not shown). The hub 28 contains two, one-way clutches in each of the end drums thereof. These clutches enable propulsion power to be transferred to the rear wheel for driving the bicycle forwardly. The clutches also permit the bicycle to be rolled back without interference or the rear wheel locking up.

The rear wheel assemblies are connected to the pedal levers 2 by a loop made up of a flexible interconnecting chain and pulley system having a flexible cable 9 and three idler pulleys 7, 12 and 12a (see FIG. 2). The loop extends from the link 13 which is connected to the moving link member 41 in the speed change device through a portion of the cable 9, which is entrained around one of the idler pulleys 12, and then passes around one of the sprockets 10. The end of this chain portion is connected with a connector 11 to a cable 8 which passes around the idler pulley 7. It will be noted that the axis of the pulleys 12 and 12a, which can be sprockets, since the chain rollers are therein engaged, is essentially parallel to the axis of the main shaft 45. The axis of the idler pulley 7 is essentially perpendicular to the axis of the rear wheel axle 27 (the axis of the hub 28). From the end of the cable 8, another length of the flexible chain extends around the other sprocket 10, around the other idler roller 12a, and back down to another connecting link 13 to the movable member 41 of the other speed change device 3.

The cable 9 is a flexible cable made up of an elastomeric (rubber) belt which may be reinforced with thin steel wire and which has rollers (cylinders molded integrally with the belt), preferably of hard plastic such as nylon or polyurethane molded therein. This chain 9 may be referred to as a robotic belt, and provides a precision timing chain which is sufficiently flexible so as to absorb any shocks and vibrations in the propulsion system.

It will therefore be seen that, when the bicycle rider executes a walking like motion, downward force is applied to the pedals 1 and through the levers 2 to the speed changing devices 3. The rocking pawls 15 and 15' will be actuated to locate the connecting links 13 and the moveable members 41 at any of three gear positions selected by the control or shifter lever 6. This lever 6 is a single lever, which is manually operable with one-hand. The forces are then transferred through the link 13 and the robotic belt 9 to the sprockets 10 and thence to the rear hub assembly 14. The bicycle is then propelled forwardly. As each pedal moves alternately up and down (see-saw motion), the chain 9 changes direction as it moves around the pulley 7.

The speed change devices will be best understood from FIG. 6. The housing of each device is a rectangular box having a slot defined by an interior surface 42. The connecting member 41 moves longitudinally in this slot (See also FIG. 2). The rocking pawls 15 and 15' are pivoted intermediate the ends thereof and approximately at their centers. Each pawl has step-shaped portions at the opposite ends thereof. In the first gear position, the connecting link member 41 is located to the left as shown in FIG. 6A. This is because the bar 36 and the camming fingers 37 and 37' pivot the pawls in the same direction, because they are located to the left (as viewed in FIG. 6) of the pivots 44 and 44' which connect the pawls to the housing. For the intermediate or second gear position (See FIG. 6B), the cable allows the spring 35 which biases the bar towards the right, to move the bar 36 to an intermediate position. There the finger 37 is located so as to be slightly to the right of the pivot of one of the pawls 15, and to the left of the pivot in the other pawl 15'. The pawls then define an intermediate location in which the connecting member 41 can be captured. The lever arm of the pedal lever (from the location of the connecting member 41 to the main shaft 45), in the second gear position location, is longer than in the first gear position. This provides the second highest mechanical advantage of the three gear ratios available. In the third gear position, both of the rocking pawls are engaged to the right of their pivots and the location of the connecting member 41 is all the way to the right in the housing. It will be observed that the upper surfaces of the rocking pawls are inclined to allow the pawls to rock against the bias of the fingers 37 and permit the movement of the connecting link member 41 to the various gear positions. Such movement is permitted until the link is caught and captured by a step at the end of a link, as will be apparent from FIGS. 6A, B, and C.

After a gear position is selected, force is transferred (see FIG. 2) from the speed change device 3 through the connecting link 13. The connecting link extends upward and is joined to the robotic belt 9. The belt moves over the idler pulley 12, which is attached to the frame. The belt then extends rearwardly and wraps around one of the rear sprockets 10. After exiting the rear sprocket, the belt extends forwardly where it connects to the cable 8. The cable extends around the idler pulley 7. This pulley 7 provides a means of direction reversal for the cable. As the cable exits the opposite side of the idler pulley 7, it extends rearwardly, next to another portion of the robotic belt 9 that wraps around the sprocket 10 on the opposite side of the hub 14. Then the belt extends to the other idler pulley 12a and joins to another connecting link 13 to the speed change device 3 on the other pedal lever 2. It will therefore be seen that there is a continuous loop between the pedal levers which is provided by the flexible chain and pulley system.

The robotic belt system provides inertia shock relief, similar to when a persons' leg strikes the ground when walking. The robotic belt 9 acts as shock absorber, as the pedals stop at the upper and lower limits of the stroke. Therefore, excess shock is not allowed to be transmitted to the speed change devices 3 and to the rear hub assembly 14. The result is a decrease in failure rate and an increase in the reliability of the propulsion system. All of the oscillating, up and down motion of the pedal levers is used for propulsion of the bicycle and leg motion is not wasted. A bicycle provided in accordance with the invention will be more comfortable and easier to ride for a longer period than is the case with a conventional bicycle.

It will further be observed that the stroke angle can be modified by changing the orientation of the housing of the speed change devices. The rider also can adjust the length of the stroke within the total operational arc. This enables all of the up and down motion of the pedal levers to be transferred to the rear wheel with a minimum loss of efficiency. Riders can learn to ride the bicycle without special skills, since the up and down motion of the pedal levers is the same as walking motion. As noted previously the inertia in the system, upon stopping the pedal levers at their upper and lower stroke limits, is shock absorbed by the flexible, robotic belt and the natural motion of the riders' legs. The result is minimum transfer of excess shock to the propulsion mechanisms.

Gear selection may be made while the levers are stationary or while pedaling. However, certain conditions must exist for each of these cases. In a first case (Case I), shifting can take place while levers are stationary. When a lever 2 is positioned lower than horizontal as in FIG. 1 and an alternate gear is selected, gear changing may take place due to gravity on the moving link member 41 and connecting link 13. This gear repositioning will depend on the relative location of components, friction, and forces. Position movement could be from any of the gear positions to the other, as for example: first to second; second to third; or first to third. With the lever 2 positioned below horizontal, the opposite lever will be positioned above horizontal. Gravity shifting will not take place in the lever which is positioned above horizontal. When the levers are operated, the moving link members 41 will then position correctly for the gear selected.

In the second case, shifting while pedaling, as the pedals and levers are operated and an alternate gear is selected, moving link member 41 slides along the surface 42 in the slot in the housing, and is captured at the gear position selected. This occurs when the angle between the connecting link 13 and gear ratio selection link 3 permits this sliding motion. One full cycle of pedaling is required for both left and right moving links to reposition at the selected gear location. Gear selection can be made sequentially or non-sequentially as: 1-2-3, 3-2-1, or 1-3, 3-1, respectively.

Individual gear selection is accomplished as follows:

a. First gear, FIG. 6A, provides the highest mechanical advantage of the lever system. Gear ratio selector 6 is positioned so that the maximum amount of cable 34 is wrapped around its outer diameter. The cable slides within cable casing 5 and through the cable casing attaching point opening, at one end of gear ratio selection bar 3. The cable 34 then passes through return spring 35 and terminates at the selection bar 36. With the maximum amount of cable pulled out of the housing of the device 3, spring 35 is in its most compressed condition. This spring and cable 34 combination positively locates the selection bar 36 at the selected gear ration position (first gear in this case). Gear ratio changes are accomplished by the single hand operated lever of the selector 6, either sequentially or non-sequentially. Shifting changes can be made while in motion, with any amount of force applied to the pedals, or at rest. Camming spring fingers 37 and 37', which are attached to the selection bar 36, forces the first gear portion of rocking pawl 15, which pivots on pin 44, in a position that will capture moving link member 41 between itself and the wall of the gear ratio selection bar 3. At this time spring 37' positions the second gear portion of rocking pawl 15' so that a stop location is provided for the moving link at second gear. This process is also duplicated in the opposing speed change device 3, as its pedal and lever is operated.

b. Second gear, FIG. 6 (B), provides the second highest mechanical advantage of the three gear ratios available. The gear ratio selector 6 is positioned such that a lesser amount of cable 34 is wrapped around its outer diameter than first gear. The biasing spring 35 forces the selection bar 36 away from first gear position and into second gear position. The camming spring finger 37 is now in a position to pivot the second gear portion of rocking pawl 15 so a stop wall is provided. The spring finger 37' moves from first gear position on the pawl 15', toward the pivot pin 44'. The pawl 15' does not pivot and remains as located under first gear conditions. A positive stop location is provided for the moving link member 41 at second gear position. When the pedals and levers are operated at such an angle that the moving link member 41 slides on surface 42, the member 41 moves toward second gear position. The second gear position of the rocking pawl 15 is in the path of the moving link member 41. As the moving link member 41 passes over the rocking pawl 15 the pawl pivots on pin 44 and allows the moving link to pass freely. When the link clears that pawl 15 and stops at second gear position, the spring finger 37 pivots the pawl 15 back into a position that captures the moving link member 41. The camming spring fingers 37 and 37' maintain the pawls 15 and 15', respectively, in positions that will not permit further sliding movement of the moving link member 41 along the slot surface 42. This process is also duplicated in the opposing gear ratio selection bar 3, as its pedal and lever is operated.

c. Third gear, FIG. 6 (C), provides the least mechanical advantage of the three gears available, but provides the greatest distance traveled for each stroke of the pedal levers 2. The gear ratio selector 6 is positioned such that a minimum amount of cable 34 is wrapped around its outer diameter. The biasing spring 35 forces the selection bar 36 away from second gear position. The camming spring finger 37 is repositioned but continues to position the rocking pawl 15 as it was in second gear position. This location of the pawl 15 also prevents moving link member 41 from returning to first gear position. The camming spring finger 37' moves past the pivot pin 44' and forces the pawl 15' to pivot into third gear position. This provides a stop wall. The outer edge of the slot in the housing provides a second wall which captures the moving link member 41 when it is located at third gear position. When the pawl 15' pivots from its second gear position, it moves out of the path of the moving link member 41; therefore, only the stop wall at the end of the housing slot remains. As the pedal and lever is operated, the moving link member 41 is prevented from moving into first gear position by the rocking pawl 15. The moving link member 41 therefore slides along surface 42 toward third gear position. During the travel of the link member 41, it encounters the angled surface of rocking pawl 15'. The link member 41 pushes against this angled surface and forces the pawl 15' away from the link member 41. When the moving link stops against the end wall of the housing of the speed change device 3, the spring 37' forces the rocking pawl 15' back into a position that provides a second stop wall for the moving link member 41. The link member 41 is now captured in third gear position. This process is also duplicated in the opposing speed change device 3, as its pedal and lever is operated.

The preceding exemplified sequential order shifting 1-2-3. Down shifting 3-2-1 or non-sequential shifting 1-3, 3-1 is also possible. To accomplish shifting other than in the exemplary sequence described above, the corresponding components interact to provide proper positioning for the moving link member 41 in the gear selected.

Figure 3:
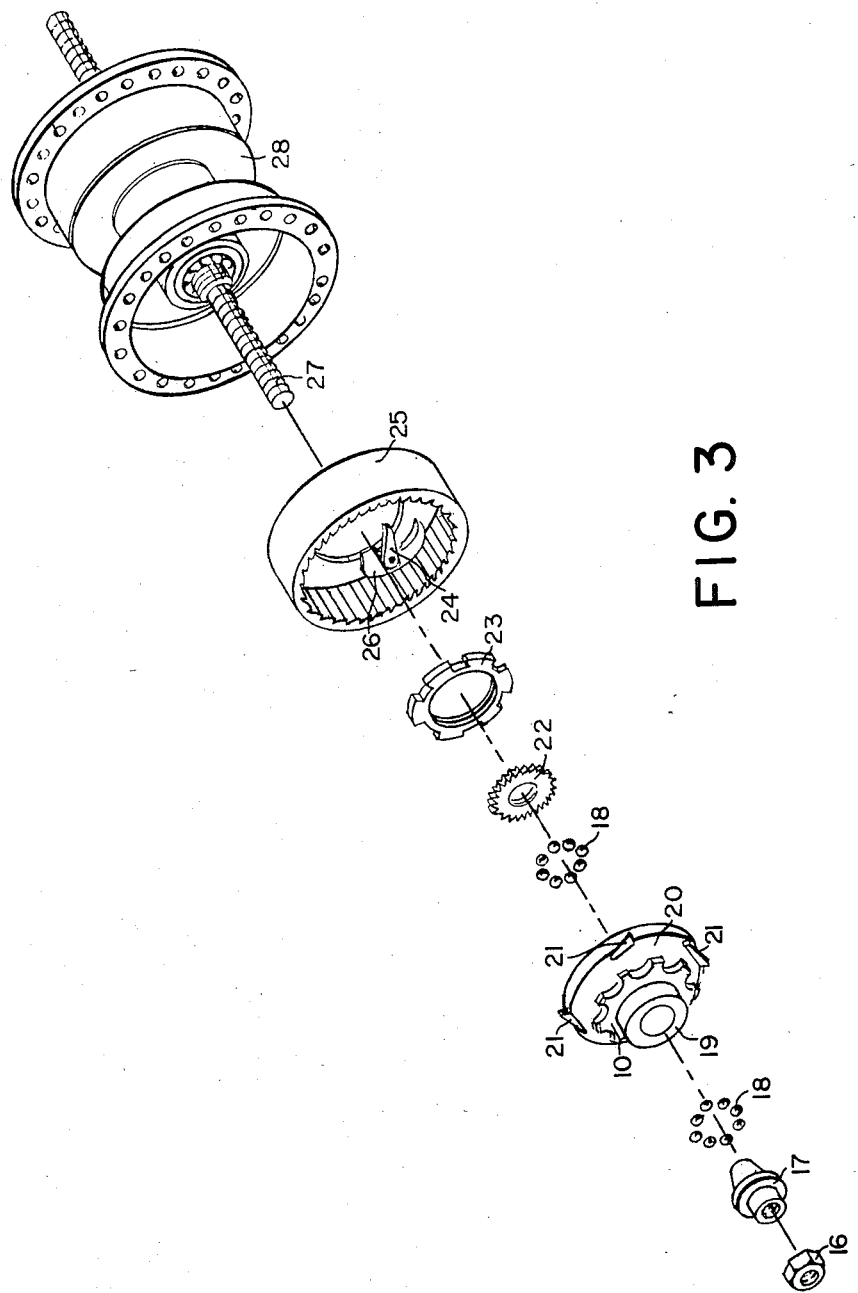
FIG. 3 is an exploded view illustrating the rear hub assembly including one of the one-way clutches.
Figure 4B:
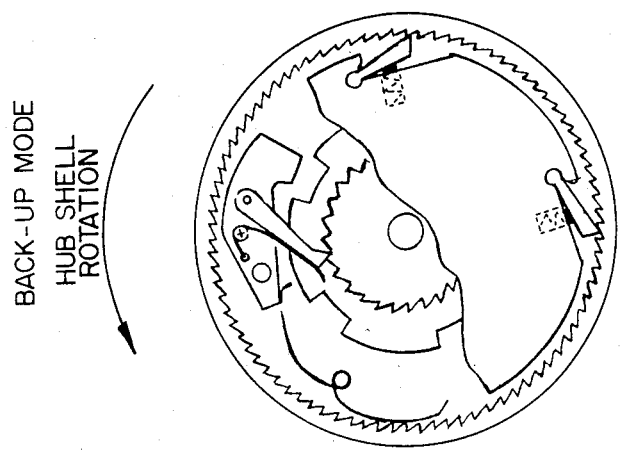
FIG. 4 shows in views (A) and (B), side, cut-away views of the dual, pawl and ratchet mechanisms of the one-way clutches provided in accordance with an embodiment of the invention, in the forward and backup modes respectively.
Figure 4A:
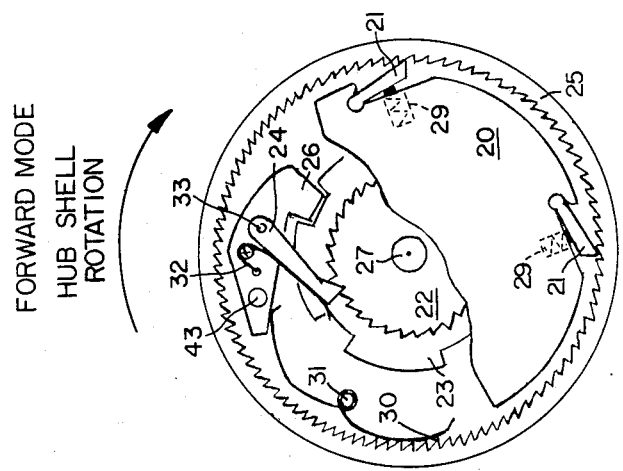
Figure 5:
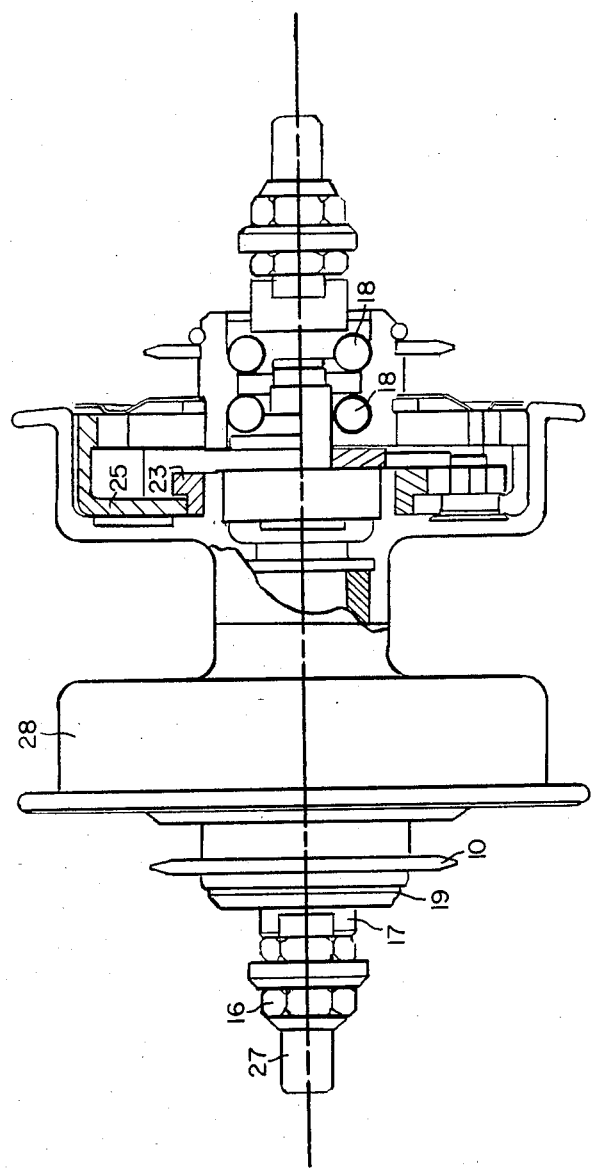
FIG. 5 is a front view of the rear hub assembly, broken away to illustrate components thereof in section.

Consider next the rear hub assembly 28 as shown particularly, in FIGS. 3–5. This assembly is characterized by dual, pawl-ratcheting mechanisms which provide the following functions: (1) forward motion to the bicycle when the left pedal lever is depressed; (2) forward motion when the right pedal lever is depressed; and (3) release of both the left and right drives to allow the bicycle to roll back.

The first of the pawl-ratcheting mechanisms is provided by a ratchet wheel 25, which is free to rotate about the rear wheel axle 27, and pawls 21 in a driver disk 20 which rotates with (is threaded on or keyed to) the sprocket 10. The second ratchet mechanism is provided by a clutch disk member 23 which is rotatable with the rear hub drum or shell 28 and a clutch pawl 26, which is pivotally mounted on the flange of the ratchet wheel 25 by a pivot pin 43. This second, pawl-ratcheting member includes a ratchet wheel 22, which is also rotatable with the hub 28, and a back pawl 24 which is pivotally mounted on the clutch pawl 26. It will be observed that the clutch pawl 26 and back pawl 28 have the shape of the Greek letter Lambda.

There are ball bearings 18, assembly cones 17 and nuts 16 which hold the clutch mechanism in the drums at the end of the hub 28.

In operation, when one pedal is depressed, the upper portion of the robotic belt 9 is pulled forwardly over the sprocket 10. The rotating sprocket turns the sprocket hub 19 and the driver disk 20 which are rotatable together as a unit. The rotating driver 20 allows one of the pawls 21 (all of which pawls 21 are biased outwardly from the center of the hub by springs 29) to engage one of the teeth of the ratchet wheel 25. These teeth are on the inner periphery of the ratchet wheel 25. It will be seen that these teeth are oppositely directed, in terms of pawl catching ability, to the teeth of the ratchet 22 in the second, pawl-ratcheting mechanism. The forces applied to the ratchet wheel 25 are transferred through the pivot pin 43, which is attached to the flange of that wheel and on which the clutch pawl 26 is pivotally mounted. The pawl 26 is biased by a hairpin spring 30 mounted on the flange of the ratchet wheel 25 on a pin 31. The clutch pawl becomes locked into one of the notches on the clutch member 23. The clutch member is locked (e.g., keyed) to the hub 28. The hub will then turn and the spokes of the wheel will transfer the forces to the wheel rim, tire, and to the road surface for forward propulsion.

During the time that one of the pedals is depressed, the opposite pedal is moving upward. The closed loop robotic belt and pulley system will cause the non-driving side hub sprocket 10 to turn in a free-turning, reverse direction. The lower portion of the belt 9 is pulled forward and the sprocket 10 on the non-driving side rotates in the opposite direction of the driving sprocket. The non-driving sprocket hub 19 and driver 20 are moved in a direction opposite to that of the ratchet wheel 25. The pawls 21 then disengage from the ratchet wheel teeth in the non-driving, one-way clutch mechanism. Thus the driver disk, hub and sprocket of the non-driving clutch mechanism turn freely when in non-driving condition. The pawls 21 in each of the one-clutches engage and disengage alternately on each side of the rear hub assembly, as the pedals are operated up and down.

The second clutch mechanism enables the bicycle to be wheeled or rolled backwards for normal use. For a lever propelled bicycle to have this capability of roll back, without causing damage to the bicycle, is provided for by the second, pawl-ratcheting mechanism which releases or disengages the rear wheel from the sprocket 10 and chain. The release mechanism enables the bicycle to be rolled backwards without interference with or damage to other parts of the transmission system.

The roll back mechanism functions during forward drive, as shown in FIG. 4(A), with the rear hub axle locked in position on the bicycle frame, and the hub 28 rotating in a forward driving direction. The back pawl 24, which is biased by the spring 32 and pivots on the back pawl pivot pin 33, disengages from the back ratchet 22 and follows the circumference thereof with a ratcheting action. The disengagement of the back ratchet and pawl enables the clutch pawl 26 to pivot on pin 43, and to engage the clutch member 23. This places the hub in the forward drive mode with the drive mechanism fully engaged.

For roll back, and as shown in FIG. 4(B), with the rear hub axle locked in position on the bicycle frame and hub rotating in the rearward direction, the back pawl 24 engages the back ratchet 22. This actuates the clutch pawl 26 and disengages it from the clutch 23. Since the clutch is attached directly to the hub 28, the hub is disengaged from the forward drive mechanism and can rotate backwards freely and without damage to the transmission and to the mechanisms associated with the pedal levers.

It will be apparent that the direction of the ratchet teeth on the ratchet wheel 25 is effectively opposite from the direction of the ratchet teeth on the ratchet wheel 22, such that when the back pawl 24 is engaged, the pawls 21 on the driver disk are disengaged, and vice versa.

From the foregoing description it will be apparent that there has been provided an improved propulsion and speed change mechanism for lever propelled bicycles. It will be appreciated that the speed change mechanism and the one-way clutch mechanisms which are provided in accordance with the invention may find independent use in lever propelled bicycles. Variations and modifications in the described mechanisms, within the scope of the invention, will undoubtedly suggest themselves to those skilled in the art. Accordingly the foregoing description should be taken as illustrative and not in a limiting sense.

I claim:

1. A propulsion mechanism for a lever propelled bicycle having a frame with main and rear shaft receiving portions, pedal lever assemblies including speed change devices, said assemblies being pivotally mounted in said main shaft portion, a rear axle mounted in said rear shaft portion, a rear wheel hub journalled on said rear axle, a pair of sprockets also journalled on said rear axle, a pair of one-way clutches for connecting said sprockets to said hub, said propulsion mechanism being characterized in that:

a chain of flexible material is entrained in a loop extending between each of said lever assemblies' speed change devices and around said sprockets enabling the pedal levers to execute see-saw motion as said levers are oscillated upwardly and downwardly by force applied to the pedals thereof;

a pair of pawl and ratchet mechanisms is provided in each of said one-way clutches, one of which effects locking of the clutch to impart forward motion when said pedal levers are depressed downwardly and the other of which effects release of said clutch to enable said bicycle to be rolled backwards; and each of said speed change devices having a housing having a surface extending away from said main shaft to define the length of the lever arm of said pedal lever assemblies to said main shaft, a plurality of pawls pivotally mounted in said housing to move transversely to said surface and define a plurality of locations each at a different lever arm length, a speed selection bar for pivoting said pawls, and a link connected to an end of the chain and moveable along said surface between different ones of said locations.

2. The propulsion mechanism according to claim 1 wherein said chain comprises a flexible elongated belt having rollers spaced therealong, said rollers being engageable with said sprockets.

3. The propulsion mechanism according to claim 1 further comprising first, second, and third idler pulleys mounted on said frame, said loop extending from one of said speed change devices of one of said assemblies around a first of said idler pulleys, then around one said sprockets, then around the second of said idler pulleys, then around the other of said sprockets, and then around the third of said idler pulleys to the speed change device of the other of said assemblies.

4. The propulsion mechanism according to claim 3 wherein said first and third pulleys are coaxial with each other and have the axis thereof parallel to the axis of said main shaft, and said second pulley is mounted on said frame with its axis generally perpendicular to said rear axle axis.

5. The propulsion mechanism according to claim 4 wherein said loop includes connecting links between the ends of said chain and said speed change devices, and a cable around said second pulley connected to the ends of said chain portions opposite to said first named ends of said chain.

6. The propulsion mechanism according to claim 1 wherein said hub has drums each for receiving a different one of said one-way clutches in each of which:
the first of said pawl and ratchet mechanisms includes a ratchet wheel rotatable about said rear axle in its drum, a ratchet around the inner periphery of said wheel, a driver rotatable with one of said sprockets, at least one pawl pivotally mounted on said driver and biased towards said ratchet; and
the second of said pawl and ratchet mechanisms comprises a clutch member rotatable with said hub and having at least one notch therein, a first pawl pivotally mounted on said ratchet wheel of said first pawl and ratchet mechanism and engageable with said notch whereby forward driving force is transferred from said one sprocket through said driver and, said pawl of said first pawl and ratchet mechanism to said ratchet wheel and from said ratchet wheel to said first pawl, to said clutch member and to said hub.

7. The propulsion mechanism according to claim 6 wherein said second pawl and ratchet mechanism further comprises a second ratchet wheel rotatable with said hub, a second pawl pivotally mounted on said first pawl and engageable with the ratchet of said second ratchet wheel for pivoting said first pawl and releasing said first pawl from said clutch member when said hub is rotated in the reverse direction.

8. The propulsion mechanism according to claim 7 wherein the ratchet on said first ratchet wheel and the ratchet on said second ratchet wheel are oriented with respect to each other such that the pawl engageable with said first ratchet wheel slips over the ratchet thereof when the pawl engageable with the ratchet of said second ratchet wheel is engaged, and vice versa.

9. The propulsion mechanism according to claim 7 wherein said first and second pawls of said second pawl and ratchet mechanisms when assembled are in the shape of the Greek letter Lambda.

10. The propulsion mechanism according to claim 1 wherein said speed change devices are mounted on arms of said assemblies on the same side of said shaft as said arms.

11. The propulsion mechanism according to claim 10 wherein said assemblies have pedal levers, said housings being mounted on said levers between the pedals of said assemblies and said main shaft.

12. The propulsion mechanism according to claim 1 wherein said surface in said housing and said housing define a longitudinal slot, a member moveable in said slot and linked to one end of said chain, said bar being moveable in said longitudinal direction, said pawls in said housing having pivots providing pivotal mountings for said pawls intermediate the ends thereof, means on said bar for engaging said pawls at different locations with respect to the pivots thereof for selectively pivoting said pawls in opposite directions to define different ones of said plurality of locations where said member which is linked to said chain is captured.

13. The propulsion mechanism according to claim 12 further comprising a speed change control, and means connecting said bar to said control.

14. The propulsion mechanism according to claim 13 further comprising means biasing said bar longitudinally toward one of the ends of said housing.

15. The propulsion mechanism according to claim 13 wherein said pawl engaging means are springs attached to said bar for camming said pawls to pivot them in said opposite directions.

16. The propulsion mechanism according to claim 15 wherein said pawls have steps in the opposite ends thereof.

17. The propulsion mechanism according to claim 15 wherein said springs are camming fingers spaced longitudinally along said bar, a different one of said fingers being provided for each of said pawls and being disposed in engagement therewith.

18. The propulsion mechanism according to claim 17 wherein the surfaces, of said pawls facing said slot are inclined towards said slot from locations adjacent the pivot on which said pawls are pivoted to the opposite ends of said pawls.

19. A propulsion mechanism for a lever propelled bicycle having a frame with main and rear shaft receiving portions, pedal lever assemblies, said assemblies being pivotally mounted in said main shaft portion, a rear axle mounted in said rear shaft portion, a rear wheel hub journalled on said rear axle, a pair of sprockets also journalled on said rear axle, a pair of one-way clutches for connecting said sprockets to said hub, said propulsion mechanism being characterized in a pairs of pawl and ratchet mechanisms is provided in each of said one-way clutches, one of which effects locking of the clutch to impart forward motion when said pedal levers are depressed downwardly and the other of which effects release of said clutch to enable said bicycle to be rolled backwards.

20. The propulsion mechanism according to claim 19 wherein said hub has drums each for receiving a different one of said one-way clutches in each of which:
the first of said pawl and ratchet mechanism includes a ratchet wheel rotatable about said rear axle in its drum, a ratchet around the inner periphery of said wheel, a driver rotatable with one of said sprockets, at least one pawl pivotally mounted on said driver and biased towards said ratchet; and
the second of said pawl and ratchet mechanisms comprises a clutch member rotatable with said hub and having at least one notch therein, a first pawl pivotally mounted on said ratchet wheel of said first pawl and ratchet mechanism and engageable with said notch whereby forward driving force is transferred from said one sprocket through said driver and said pawl of said first pawl and ratchet mechanism to said ratchet wheel and from said ratchet wheel to said first pawl, to said clutch member and to said hub.

21. The propulsion mechanism according to claim 20 wherein said second pawl and ratchet mechanism further comprises a second ratchet wheel rotatable with said hub, a second pawl pivotally mounted on said first pawl and engageable with the ratchet of said second ratchet wheel for pivoting said first pawl and releasing said first pawl from said clutch member when said hub is rotated in the reverse direction.

22. The propulsion mechanism according to claim 20 wherein the ratchet on said first ratchet wheel and the ratchet on said second ratchet wheel are oriented with respect to each other such that the pawl engageable with said first ratchet wheel slips over the ratchet thereof when the pawl engageable with the ratchet of said second ratchet wheel is engaged, and vice versa.

23. The propulsion mechanism according to claim 20 wherein said first and second pawls of said second pawl and ratchet mechanisms when assembled are in the shape of the Greek letter Lambda.

24. In a propulsion mechanism for a lever propelled bicycle having a frame with main and rear shaft receiving portions and having pedal lever assemblies including lever arm length change devices, said assemblies being pivotally mounted in said main shaft portion, a rear axle mounted in said rear shaft portion, a rear wheel hub journalled on said rear axle, at least one sprocket also journalled on said rear axle, a chain around said sprocket for transferring propulsion forces from the devices to said rear wheel hub and enabling the pedal levers to execute see-saw motion as said levers are oscillated upwardly and downwardly by force applied to the pedals thereof the improvement wherein each of said change devices comprises a housing having a surface extending away from said main shaft to define the length of the lever arm of said pedal lever assemblies to said main shaft, a plurality of pawls pivotally mounted in said housing to move transversely to said surface and define a plurality of locations each at a different lever arm length, a speed change bar for pivoting said pawls, and a link connected to an end of the chain and moveable along said surface between different ones of said locations.

25. The propulsion mechanism according to claim 23 wherein said devices are mounted on arms of said assemblies on the same side of said shaft as said arms.

26. The propulsion mechanism according to claim 24 wherein said assemblies have pedal levers, said housings being mounted on said levers between the pedals of said assemblies and said main shaft.

27. In a propulsion mechanism for a lever propelled bicycle having a frame with main and rear shaft receiving portions and having pedal lever assemblies including lever arm length change devices, said assemblies being pivotally mounted in said main shaft portion, a rear axle mounted in said rear shaft portion, a rear wheel hub journalled on said rear axle, at least one sprocket also journalled on said rear axle, a chain around said sprocket for transferring propulsion forces from the devices to said rear wheel hub and enabling the pedal levers to execute see-saw motion as said levers are oscillated upwardly and downwardly by force applied to the pedals thereof, the improvement wherein each of said change devices comprises a housing having a surface extending away from said main shaft to define the length of the lever arm of said pedal lever assemblies to said main shaft, a plurality of pawls pivotally mounted in said housing to move transversely to said surface and define a plurality of locations each at a different lever arm length, a speed change bar for pivoting said pawls, a link connected to an end of the chain and moveable along said surface between different ones of said locations, said surface in said housing and said housing defining a longitudinal slot, a member moveable in said slot and linked to one end of said chain, said bar being moveable in said longitudinal direction, said pawls in said housing in said pivots providing pivotal mountings for said pawls intermediate the ends thereof, means on said bar for engaging said pawls at different locations with respect to the pivots thereof for selectively pivoting said pawls in opposite directions to define different ones of said plurality of locations where said member which is linked to said chain is captured.

28. The propulsion mechanism according to claim 27 further comprising a speed change control and means connecting said bar to said control.

29. The propulsion mechanism according to claim 27 further comprising means biasing said bar longitudinally toward one of the ends of said housing.

30. The propulsion mechanism according to claim 27 wherein said pawl engaging means are springs attached to said bar for camming said pawls to pivot them in said opposite directions.

31. The propulsion mechanism according to claim 29 wherein said pawls have steps in the opposite ends thereof.

32. The propulsion mechanism according to claim 29 wherein said springs are camming fingers spaced longitudinally along said bar, a different one of said fingers being provided for each of said pawls and being disposed in engagement therewith.

33. The propulsion mechanism according to claim 31 wherein the surfaces of said pawls facing said slot are inclined towards said slot from locations adjacent the pivot on which said pawls are pivoted to the opposite ends of said pawls.

34. The propulsion mechanism according to claim 24 wherein means are provided for mounting said housing on said lever arm inclined with respect to said arm.

* * * * *